(12) United States Patent
Sheth et al.

(10) Patent No.: US 9,712,573 B2
(45) Date of Patent: Jul. 18, 2017

(54) SYNCHRONIZED WIRELESS DISPLAY DEVICES

(75) Inventors: Soham V. Sheth, San Diego, CA (US); Samir Salib Soliman, Poway, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/559,313

(22) Filed: Jul. 26, 2012

(65) Prior Publication Data

US 2013/0188632 A1 Jul. 25, 2013

Related U.S. Application Data

(60) Provisional application No. 61/534,193, filed on Sep. 13, 2011, provisional application No. 61/539,726, (Continued)

(51) Int. Cl.
*H04L 29/06* (2006.01)
*H04N 21/43* (2011.01)
(Continued)

(52) U.S. Cl.
CPC ........ *H04L 65/4015* (2013.01); *G06F 3/1423* (2013.01); *G06T 1/60* (2013.01);
(Continued)

(58) Field of Classification Search
None
See application file for complete search history.

(56) References Cited

U.S. PATENT DOCUMENTS 6,092,142 A 7/2000 Mehta et al.
7,464,172 B2 12/2008 Deshpande
(Continued)

FOREIGN PATENT DOCUMENTS

EP 1398931 A1 3/2004
JP 2003235027 A 8/2003
(Continued)

OTHER PUBLICATIONS

International Search Report—PCT/US2012/054499—ISA/EPO—Nov. 26, 2012.
(Continued)

*Primary Examiner* — Chi H Pham
*Assistant Examiner* — Raul Rivas
(74) *Attorney, Agent, or Firm* — Campbell C. Chiang

(57) ABSTRACT

This disclosure relates to techniques for synchronizing playback of media data between a source device and one or more sink devices in a Wireless Display (WD) system. WD systems enable mobile devices to share a local display of the source device with remote sink devices. The techniques of this disclosure include a management procedure at the source device to select a universal queue size for the source device and the participating sink devices. The source device selects the universal queue size based at least on supported queue sizes of the source device and the sink devices. The media packets are then held in queues having the universal queue size at the source device and the sink devices. The uniform queue size combined with compensation for transmission delay enables each of the devices to begin processing the media packets at the same time.

36 Claims, 9 Drawing Sheets

Related U.S. Application Data filed on Sep. 27, 2011, provisional application No. 61/595,932, filed on Feb. 7, 2012.

(51) Int. Cl.

| | | |
|---|---|---|
| H04N 21/4363 | (2011.01) | |
| H04N 21/44 | (2011.01) | |
| H04N 21/6547 | (2011.01) | |
| H04L 12/841 | (2013.01) | |
| H04L 12/861 | (2013.01) | |
| G06F 3/14 | (2006.01) | |
| G06T 1/60 | (2006.01) | |
| H04L 12/18 | (2006.01) | |
| H04L 12/863 | (2013.01) | |
| H04W 56/00 | (2009.01) | |
| H04L 12/815 | (2013.01) | |
| H04L 12/801 | (2013.01) | |

(52) U.S. Cl.
CPC ............ *H04L 12/189* (2013.01); *H04L 47/28* (2013.01); *H04L 47/621* (2013.01); *H04L 49/90* (2013.01); *H04N 21/4302* (2013.01); *H04N 21/43637* (2013.01); *H04N 21/44004* (2013.01); *H04N 21/6547* (2013.01); *H04W 56/0015* (2013.01); *H04L 47/14* (2013.01); *H04L 47/22* (2013.01)

(56) References Cited

U.S. PATENT DOCUMENTS 8,406,245 B2  3/2013  Raveendran

| | | |
|---|---|---|
| 2003/0061371 A1 | 3/2003 | Deshpande |
| 2004/0228367 A1 | 11/2004 | Mosig et al. |
| 2005/0262261 A1* | 11/2005 | Deshpande .............. 709/231 |
| 2009/0210474 A1 | 8/2009 | Shao et al. |
| 2010/0020686 A1* | 1/2010 | Lee ............... H04L 12/5693 370/231 |
| 2010/0142723 A1 | 6/2010 | Bucklen |
| 2010/0260296 A1 | 10/2010 | Chorney et al. |
| 2011/0066746 A1 | 3/2011 | Bennett et al. |
| 2014/0362849 A1 | 12/2014 | Sheth et al. |

FOREIGN PATENT DOCUMENTS

| | | |
|---|---|---|
| JP | 2004104796 A | 4/2004 |
| JP | 2005354351 A | 12/2005 |
| TW | 201002066 A | 1/2010 |
| WO | 2007079334 A2 | 7/2007 |
| WO | 2011005707 | 1/2011 |

OTHER PUBLICATIONS

Taiwan Search Report—TW101133153—TIPO—Aug. 22, 2014.

Written Opinion—PCT/US2012/054499—ISA/EPO—Nov. 26, 2012.

Schulzrinne H., et al., "RTP: A Transport Protocol for Real-Time Applications", Network Working Group Request for Comments: 3550, No. 1889, Jul. 2003, XP003022794, The Internet Society, pp. 1-89.

\* cited by examiner

SYNCHRONIZED WIRELESS DISPLAY DEVICES

This application claims the benefit of U.S. Provisional Application No. 61/534,193, filed Sep. 13, 2011, U.S. Provisional Application No. 61/539,726, filed Sep. 27, 2011, and U.S. Provisional Application No. 61/595,932, filed Feb. 7, 2012, the entire content each of which is incorporated herein by reference.

TECHNICAL FIELD

The disclosure relates to transport and playback of media data and, more particularly, management of the transport and playback of media data by a mobile device.

BACKGROUND

Mobile devices may take the form of mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices. Mobile devices are becoming increasingly powerful with the addition of high-power processors, the capability to process media content, and the ability to interact with networks in the cloud. These improvements make it possible to develop new usage models for the mobile devices that provide a better user experience and improve productivity.

One example of a new usage model possible with significant improvements in processing power and memory availability on a mobile device is Wireless Display or Wi-Fi Display (WFD). Wireless Display (WD) systems include a source device and one or more sink devices. The source device may be a mobile device and each of the sink devices may be either mobile devices or wired devices. The source device sends audio video (AV) data to the one or more participating sink devices. The AV data may be played back at both a local display of the source device and at each of the displays of the sink devices.

SUMMARY

In general, this disclosure relates to techniques for synchronizing playback of media data between a source device and one or more sink devices in a Wireless Display (WD) system. WD systems enable mobile devices to share a local display of the source device with remote sink devices. For example, when several people having mobile devices get together, one mobile device user may have content to share and each of the other users can use his or her own WD-capable mobile device to receive and view the content. In this scenario, the mobile device of the content owner acts as the source device and the other mobile devices act as the sink devices. Media players in the source device and each of the sink devices, however, typically use arbitrarily determined queue sizes to cache incoming media packets prior to processing for display. The source device and each of the sink devices may set queue sizes differently and, therefore, begin processing the media packets at different times. This unsynchronized processing can sometimes result in unsynchronized playback of the media data at the devices.

The techniques of this disclosure include a management procedure at the source device to select a universal queue size for the source device and the participating sink devices. The source device selects the universal queue size based at least on supported queue sizes of the source device and the sink devices. The media packets are then held in queues having the universal queue size at the source device and the sink devices prior to processing for display. The uniform queue size at each of the participating devices enables each of the devices to begin processing the media packets at the same time, which results in synchronized playback of the media data at the individual devices.

In one example, the disclosure is directed toward a method comprising establishing a communication session between a source device and one or more sink devices, notifying at least one of the sink devices of a universal queue size selected by the source device for the communication session, sending data packets to each of the sink devices, wherein the data packets are held at the sink devices in sink queues having the universal queue size, holding the data packets at the source device in a source queue having the universal queue size, and upon detecting that the source queue is full, beginning processing of the data packets in the source queue for display at the source device, wherein the processing at the source device is synchronized with processing of the data packets at the sink devices.

In another example, the disclosure is directed toward a method comprising requesting a source device to establish a communication session with a sink device, receiving a notification of a universal queue size from the source device, wherein the universal queue size is selected based on supported queue sizes of at least the source device and the sink device, receiving data packets from the source device as part of the communication session, wherein the packets are held in source queue having the universal queue size at the source device, holding the data packets in a sink queue having the universal queue size at the sink device and upon detecting that the sink queue is full, beginning processing of the packets in the sink queue for display at the sink device, wherein the packet processing at the sink device is synchronized with packet processing at the source device.

In a further example, the disclosure is directed toward a source device comprising a processor configured to establish a communication session between the source device and one or more sink devices, select a universal queue size based on supported queue sizes of the source device and the sink devices. The source device also comprises a transmitter to transmit a notification to a sink devices of the universal queue size selected for the communication session, wherein the transmitter that sends data packets to each of the sink devices as part of the communication session, wherein the data packets are held in sink queues having the universal queue size at the sink devices. The source device further comprises a source queue having the universal queue size that holds the packets, wherein, upon detecting that the source queue is full, the processor begins processing the data packets in the source queue for display at the source device, wherein the data packet processing at the source device is synchronized with packet processing at the sink devices.

In an additional example, the disclosure is directed toward a sink device comprising a processor configured to request a source device to establish a communication session with the sink device. The sink device further comprises a receiver that receives a notification of a universal queue size from the source device, wherein the universal queue size is selected based on supported queue sizes of at least the source device and the sink device, and receives packets from the source device as part of the communication session, wherein the packets are held in a source queue having the universal queue size at the source device. The source device further comprises a sink queue having the universal queue size that holds the packets, wherein, upon detecting that the sink queue is full, the processor begins processing the packets in the sink queue for display at the sink device, and wherein the packet processing at the sink device is synchronized with packet processing at least at the source device.

In a further example, the disclosure is directed toward a source device comprising means for establishing a communication session between the source device and one or more sink devices, means for notifying each of the sink devices of a universal queue size selected by the source device for the communication session, means for sending data packets to each of the sink devices, wherein the data packets are held at the sink devices in sink queues having the universal queue size, means for holding the data packets at the source device in a source queue having the universal queue size, and upon detecting that the source queue is full, means for beginning processing of the data packets in the source queue for display at the source device, wherein the processing at the source device is synchronized with processing of the data packets at the sink devices.

In a further example, the disclosure is directed toward a sink device comprising means for requesting a source device to establish a communication session with the sink device, means for receiving a notification of a universal queue size from the source device, wherein the universal queue size is selected based on supported queue sizes of at least the source device and the sink device, means for receiving packets from the source device as part of the communication session, wherein the packets are held in source queue having the universal queue size at the source device, means for holding the packets in a sink queue having the universal queue size at the sink device, and upon detecting that the sink queue is full, means for beginning processing of the packets in the sink queue for display at the sink device, wherein the packet processing at the sink device is synchronized with packet processing at the source device.

In another example, the disclosure is directed toward a computer-readable medium comprising instructions that when executed in a source device cause a processor to establish a communication session between the source device and one or more sink devices, notify each of the sink devices of a universal queue size selected by the source device for the communication session, send data packets to each of the sink devices, wherein the data packets are held at the sink devices in sink queues having the universal queue size, hold the data packets at the source device in a source queue having the universal queue size, and upon detecting that the source queue is full, beginning processing of the data packets in the source queue for display at the source device, wherein the processing at the source device is synchronized with processing of the data packets at the sink devices.

In another example, the disclosure is directed toward a computer-readable medium comprising instructions that when executed in a sink device cause a processor to request a source device to establish a communication session with the sink device, receive a notification of a universal queue size from the source device, wherein the universal queue size is selected based on supported queue sizes of at least the source device and the sink device, receive packets from the source device as part of the communication session, wherein the packets are held in source queue having the universal queue size at the source device, hold the packets in a sink queue having the universal queue size at the sink device, and upon detecting that the sink queue is full, begin processing of the packets in the sink queue for display at the sink device, wherein the packet processing at the sink device is synchronized with packet processing at the source device.

In another example, the disclosure is directed toward a method comprising establishing a communication session between a sink device and a source device, receiving a notification of a universal queue size from the source device, wherein the universal queue size is selected by the source device for the communication session, receiving data packets from the source device, wherein the data packets are held at the source device in a source queue having the universal queue size, holding the data packets at the sink device in a sink queue having the universal queue size, and upon detecting that the sink queue is full, beginning processing of the data packets in the sink queue for display at the sink device, wherein the processing at the sink device is synchronized with processing of the data packets at the source device.

The details of one or more examples of the disclosure are set forth in the accompanying drawings and the description below. Other features, objects, and advantages will be apparent from the description and drawings, and from the claims.

DETAILED DESCRIPTION

This disclosure relates to techniques for synchronizing playback of media data between a source device and one or more sink devices in a Wireless Display (WD) system. WD systems enable mobile devices to share a local display of the source device with remote sink devices. For example, when several people having mobile devices get together (e.g., a business meeting or a family/friend gathering), one mobile device user may have content, such as a video clip, that he would like to show everyone in the room and/or provide description and additional information while the content is displayed. In a WD system, everyone can use his or her own WD-capable mobile device to receive and view the content. In this scenario, the mobile device of the content owner acts as the source device and the other mobile devices act as the sinks. To provide this joint user experience, it is important that the content playback at all the devices is synchronized so that all the users see and hear the same content and relate any verbal description with the correct content.

Media players in the source device and each of the sink devices, however, typically use arbitrarily determined queue sizes to cache incoming media packets prior to processing for display. The source device and each of the sink devices may set queue sizes differently and, therefore, begin processing the media packets at different times. This unsynchronized processing will result in unsynchronized playback of the media data at the devices.

The techniques of this disclosure include a management procedure at the source device to select a universal queue size for the source device and the participating sink devices. The source device selects the universal queue size based at least on supported queue sizes of the source device and the sink devices. The media packets are then held in queues having the universal queue size at the source device and the sink devices prior to processing for display. The uniform queue size at each of the participating devices enables each of the devices to begin processing the media packets at the same time, which results in synchronized playback of the media data at the individual devices.

Figure 1:
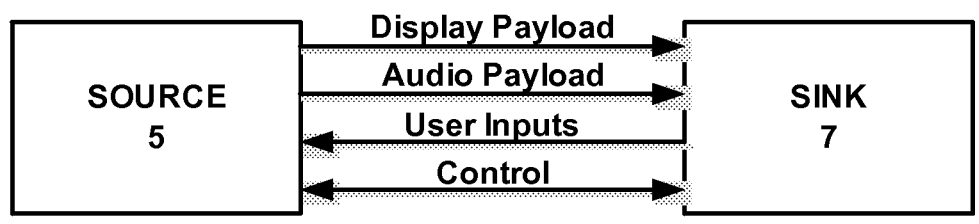
FIG. 1 is a block diagram illustrating a WD system including a source device and sink devices.

FIG. 1 is a block diagram illustrating a WD system including a source device 5 and sink devices 7. The source device sends media data, such as audio and/or video (AV) data, to one or more of the sink devices participating in a particular communication session. The media data may be played back at both a local display of the source device and at each of the displays of the sink devices. More specifically, each of the participating sink devices renders the received media data on its screen and audio equipment. In some cases, a user of a sink device may apply user inputs to the sink device, such as touch inputs and remote control inputs. In the WD system, the user inputs are sent from the sink device to the source device. The source device processes the received user inputs from the sink device and applies the effect of the user inputs on subsequent media data sent to the sink device.

Figure 2:
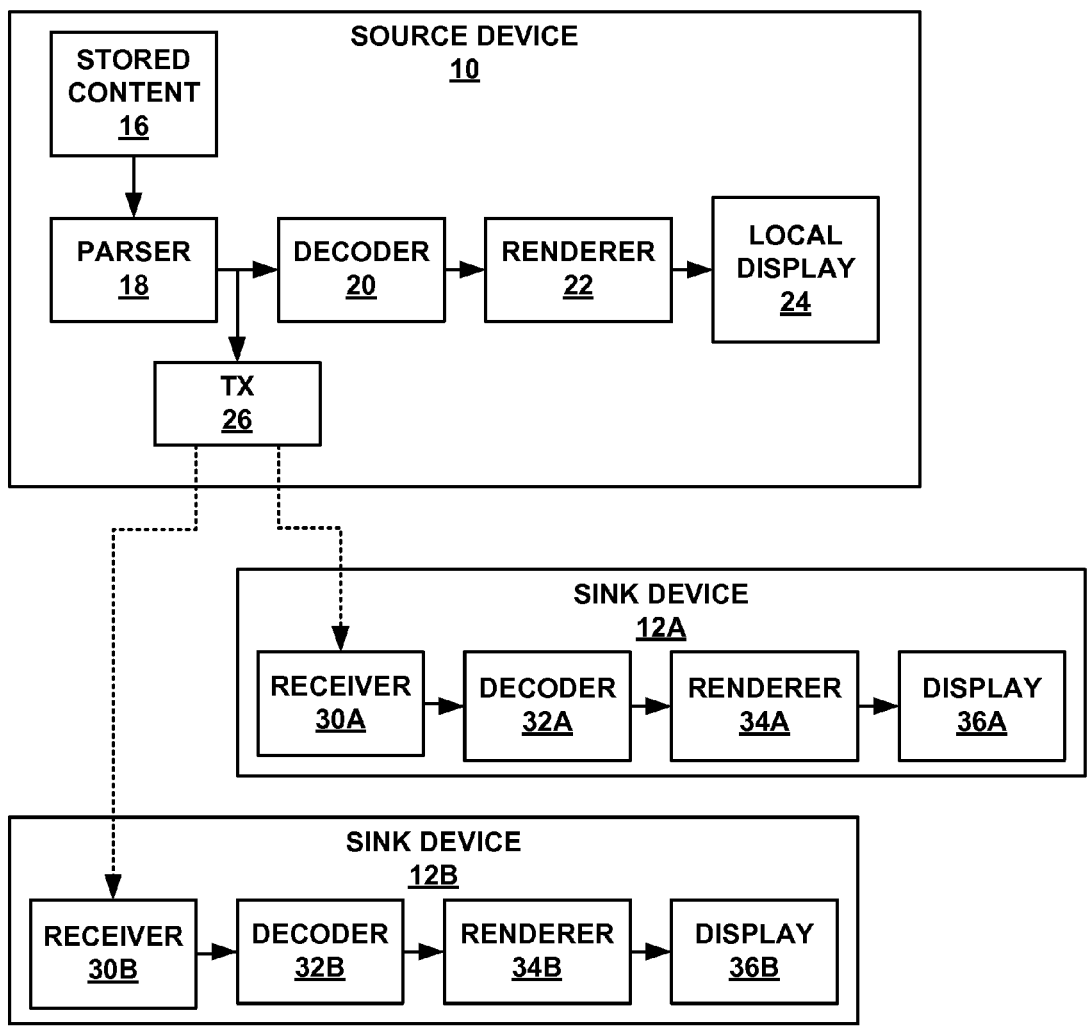
FIG. 2 is a block diagram illustrating an exemplary WD system including a source device and sink devices participating in a communication session.

FIG. 2 is a block diagram illustrating a WD system including a source device 10 and sink devices 12A-12B ("sink devices 12") participating in a communication session. In other examples, the WD system may include more than two participating sink devices. The WD system may also include one or more base stations (not shown) that support a plurality of Wi-Fi (e.g., IEEE 802.11x) networks over which the WD communication session is established between source device 10 and sink devices 12. A communication service provider may centrally operate and administer one or more of these networks using a base station as a network hub.

Source device 10 and each of sink devices 12 may take the form of mobile devices, such as mobile telephones, portable computers with wireless communication cards, personal digital assistants (PDAs), portable media players, other flash memory devices with wireless communication capabilities, or any type of wireless communication device. In other examples, one or more of sink devices 12 may take the form of wired devices with wireless communication capabilities, such as televisions, desktop computers, monitors, projectors, and the like. In the illustrated example of FIG. 2, source device 10 includes stored content 16, a parser 18, a decoder 20, a renderer 22, a local display 24 and a transmitter (TX) 26. Sink devices 12 include receivers 30A-30B ("receivers 30"), decoders 32A-32B ("decoders 32"), renderers 34A-34B ("renderers 34"), and displays 36A-36B ("displays 36").

The components of source device 10 and sink devices 12 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. Local display 24 and displays 36 may each comprise any of a variety of display devices such as a liquid crystal display (LCD), a plasma display, an organic light emitting diode (OLED) display, or another type of display device.

Figure 4:
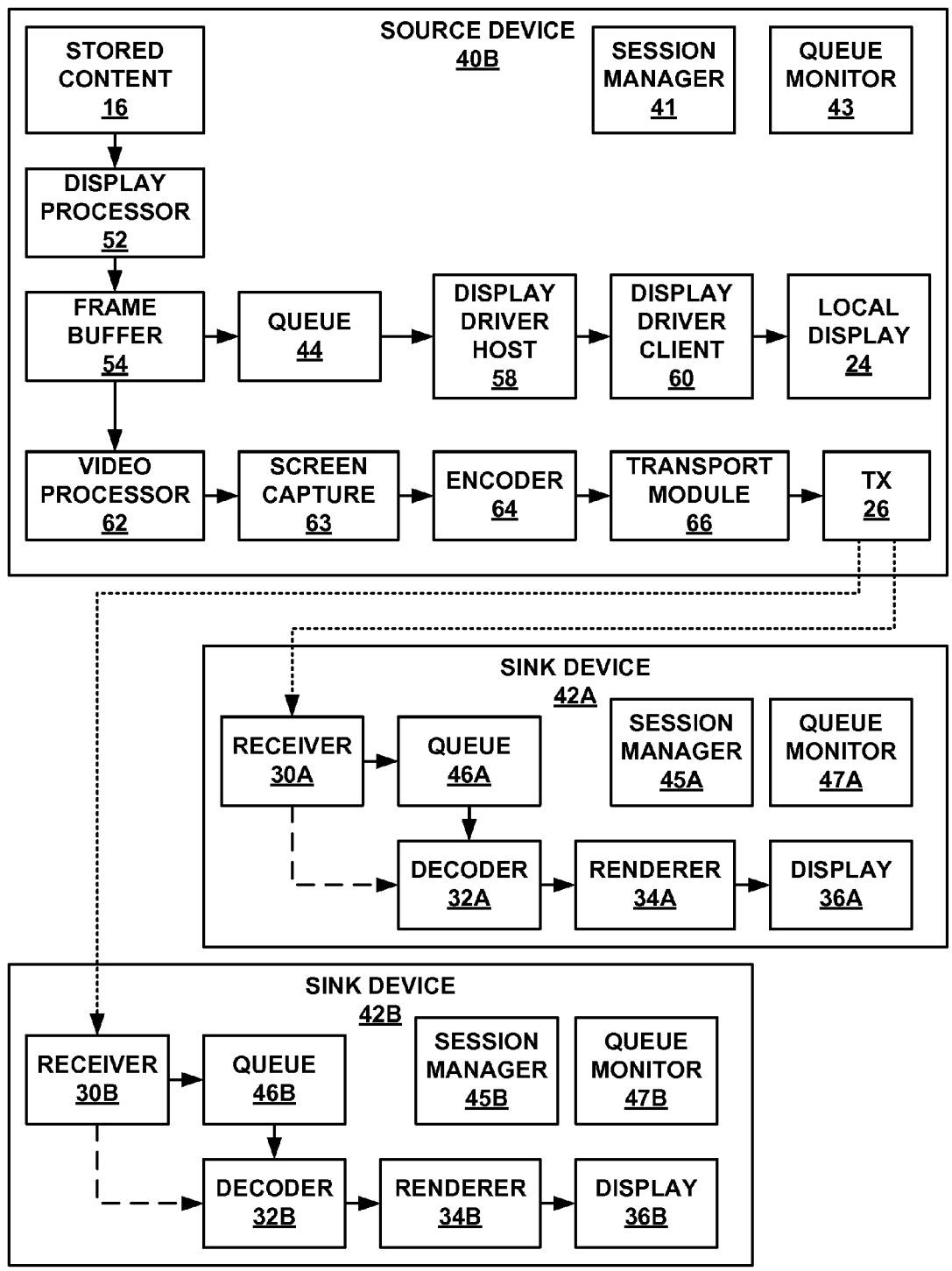
FIG. 4 is a block diagram illustrating another WD system including a source device and sink devices capable of participating in a synchronized communication session in frame buffer mode according to the techniques of this disclosure.

When source device 10 is playing back stored content 16, source device 10 may receive a request from one or more of remote sink devices 12 to setup a communication session. Source device 10 may establish the communication session between source device 10 and the one or more requesting sink devices 12 using the Real-Time Streaming Protocol (RTSP). Once established, the communication session may operate in a streaming mode in which the source device transmits stored encoded media streams, as illustrated in FIGS. 1 and 2, or in a frame buffer mode in which the source device captures, encodes, and transmits media frames, as illustrated in FIG. 4. In either case, the media data may be transmitted from the source device to the participating sink devices using the Real-time Transport protocol (RTP).

In the illustrated example of FIG. 2, stored content 16 may include encoded media data, i.e., audio and/or video data, in a memory (not shown) of source device 10. Parser 18 may be responsible for processing stored content 16 and extracting out the different media streams, i.e., audio and/or video streams. Decoder 20 receives the media streams output from parser 18 and decodes the media data within the streams. Decoder 20, for example, may include both a video decoder and an audio decoder. Renderer 22 then produces content, e.g., images and/or sound, from the decoded media data for presentation locally on source device 10. For example, renderer 22 may produce images from the decoded video data for presentation on local display 24, and may produce sound from the decoded audio data for presentation on speakers (not shown) of source device 10.

The media streams output from parser 18 are also tapped out and sent to one or both of sink devices 12 via transmitter (TX) 26 as part of the communication session. At sink devices 12, receivers 30 receive the media streams from source device 10, and decoders 32 decode the media data within the streams. Each of decoders 32, for example, may include both a video decoder and an audio decoder. Renderers 34 then produce content, e.g., images and/or sound, from the decoded media data for presentation on respective sink devices 12. For example, renderers 34 may produce images from the decoded video data for presentation on displays 36, and may produce sound from the decoded audio data for presentation on speakers (not shown) of sink devices 12.

With unsynchronized processing, each of source device 10 and sink devices 12 may use arbitrarily determined queue sizes to cache incoming media packets prior to processing for display. Each of source device 10 and sink devices 12 may set different queue sizes for a type of media data, i.e., video and/or audio data, and, therefore, begin processing the media packets at different times. This unsynchronized processing may result in unsynchronized playback of the media data at the devices. For example, if each of source device 10 and sink devices 12 begin decoding and rendering video data at a different time, the reproduced images will not be synchronized among all sink devices 12 and/or source device 10.

Figure 3:
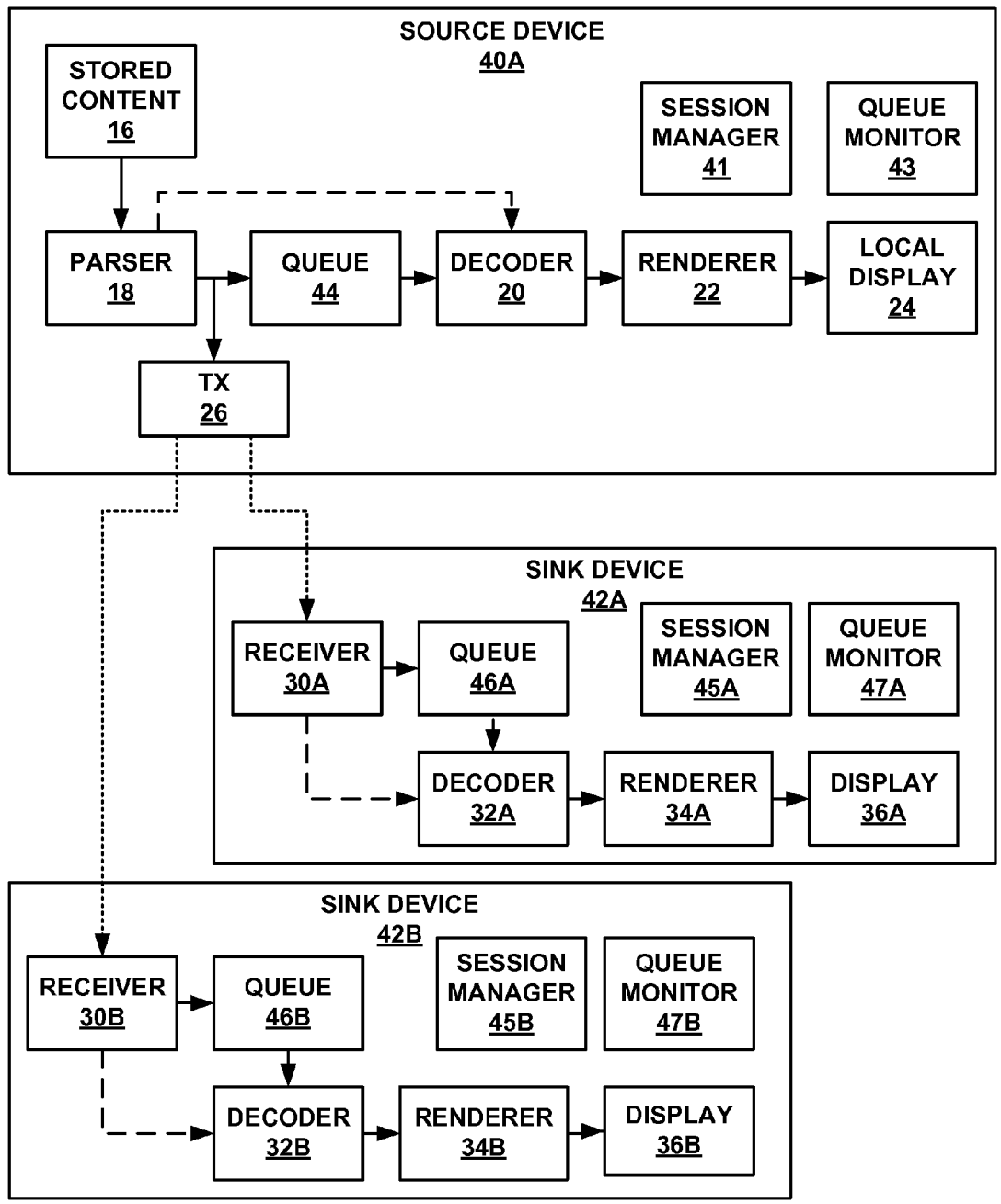
FIG. 3 is a block diagram illustrating another exemplary WD system including a source device and sink devices capable of participating in a synchronized communication session in streaming mode according to the techniques of this disclosure.

FIG. 3 is a block diagram illustrating a WD system including a source device 40A and sink devices 42A-42B ("sink devices 42") capable of participating in a synchronized communication session in streaming mode according to the techniques of this disclosure. Source device 40A includes a session manager 41 that coordinates the communication session so source device 40A and participating sink devices 42 use the same universal queue size for a type of media data. In addition, each of source device 40A and sink devices 42 includes a queue monitor that triggers packet processing upon detecting that the respective queue having the universal queue size is full. In this way, source device 40A and sink devices 42 process the media packets in synch to produce synchronized playback of the media data at the individual devices.

In the illustrated example of FIG. 3, source device 40A, similar to source device 10 from FIG. 2, includes stored content 16, parser 18, decoder 20, renderer 22, local display 24 and transmitter (TX) 26. In accordance with the described techniques, source device 40A also includes a session manager 41, queue monitor 43, and source queue 44 having the universal queue size. Sink devices 42, similar to sink devices 12 from FIG. 2, include receivers 30, decoders 32, renderers 34, and displays 36. Sink devices 42 further include session managers 45A-45B ("session managers 45"), queue monitors 47A-47B ("queue monitors 47"), and sink queues 46A-46B ("queues 46") having the universal queue size.

For purposes of explanation, it may be assumed that the communication session is setup by source device 40A using solutions for a WD system. For example, source device 40A and sink devices 42A-42B perform device discovery to identify the devices participating in the communication session.

Once the communication session is established, session manager 41 at source device 40A selects a universal queue size for use at all the participating devices during the communication session. In some examples, session manager 41 may query each of session managers 45 at sink devices 42 to determine supported queue sizes at sink devices 42. In that case, session manager 41 may select the universal queue size based on the supported queue sizes at source device 40A and sink devices 42. In other examples, source device 40A may select the universal queue size arbitrarily. Session manager 41 of source device 40A then notifies its own media processing pipeline and session managers 45 of sink devices 42 of the universal queue size. The universal queue size value may be presented in a pre-determined fashion, e.g., time duration, number of frames, or the like. The universal queue size selection process is described in more detail in FIG. 5. Session manager 41 of source device 40A may then initiate the media sessions with sink devices 42.

In addition to selecting a universal queue size to assure synchronization between different devices with different capabilities and processing delays, session manager 41 may also calculate delay interval values, including a trigger delay, for use at each of sink devices 42. The trigger delay takes into to account the different transmission times of the media packets from source device 40A to each of sink devices 42, and imposes a wait time between detecting that the sink queue is full and beginning processing of the media packets in the sink queue. In this way, the participating devices will not begin processing the media packets until the queues at each of the devices are full. In an example method each of the sink devices may be notified of their respective trigger delay interval. For example, it may be important to account for delay intervals such as transmit time at source device 40A, propagation delay between source device 40A and each of sink devices 42, and receive delay at each of sink devices 42. Each of these parameters may be measured as described below or derived using other means or methods. The transmit time parameter ("TxTime") at source device 40A represents the protocol stack processing time for transmitting data packets at source device 40A. More specifically, TxTime represents the time between when the application layer submits the payload to the transport layer and the time at which the data in the payload is processed by the physical layer (e.g., the Wi-Fi layer). An application of source device 40A may measure the loopback transmission time by sending a payload to itself, e.g., using the localhost address. Alternately, the loopback transmission time may be queried to the protocol stack. In either case:

$$TxTime = \text{Loopback transmission time}/2.$$

The propagation delay parameter depends on the proximity of source device 40A to each of sink devices 42 with which source device 40A is communicating. In the case of a WD system, the propagation delay is typically very small, e.g., a few microseconds per a few hundred feet, for a human user to experience. The propagation delay parameter, therefore, may be ignored in calculations in this disclosure.

The receive delay parameter ("RxDelay") at each of sink devices 42 represents the protocol stack processing time for receiving media packets at each of sink devices 42. Source device 40A may calculate RxDelay at each of sink devices 42 using following exemplary method. An application at source device 40A transmits a payload to, for example, sink device 42A. An equivalent application at sink device 42A transmits the same payload back to source device 40A. This allows the application at source device 40A to measure the roundtrip delay. Alternately, the roundtrip delay time may be queried to sink device 42A as it represents the processing time for the receiving stack. In either case:

$$TxDelay(\text{one way delay}) = \text{Roundtrip delay}/2, \text{ and}$$

$$RxDelay(\text{at sink device}) = TxDelay - TxTime.$$

Additional parameters used to calculate the universal queue size and the trigger delays in this disclosure include: MaxSyncQSize representing the maximum queue size supported at source device 40A; SupportedSinkQSize representing the queue size supported at each of sink devices 42 for a particulate communication session; and PktRate representing the packet generation rate at source device 40A, which may be determined by frame rate for video data. TriggerDelay represents the wait time after the sink queue having the universal queue size at each of sink devices 42 is full, but before triggering the decoder to start processing the packets held in the sink queue. SelectedOptimalQueueSize represents the universal queue size selected by source device 10 for all devices that will participate in the communication session.

Source device 40A may apply different methods to calculate the universal queue size depending on the type of communication session being established. In a first case, source device 40A establishes a communication session with only one sink device, for example sink device 42A. Source device 40A selects the universal queue size to be used by source device 40A and sink device 42A for the communication session such that:

MaxSync$Q$Size$-$(PktRate$*$$Tx$Delay)$-$UniversalQueueSize$>=0$, and

UniversalQueueSize$<=$SupportedSink$Q$Size.

In a second case, source device 40A establishes a multicast communication session with multiple sink devices 1, 2, ... n, for example both of sink devices 42. Source device 40A selects the universal queue size to be used by source device 40A and sink devices 42 for the multicast communication session such that:

$Rx$Delay$_{allDevices}$=max($Rx$Delay$_1$, $Rx$Delay$_2$, ... ,$Rx$Delay$_n$),

SupportedSink$Q$Size$_{min}$=min(SupportedSink$Q$Size$_1$, SupportedSink$Q$Size$_2$, ... SupportedSink$Q$Size$_n$), where SupportedSink$Q$Size$_i$ is the queue size supported by sink device $i$, MaxSync$Q$Size$-$(PktRate$*$$Rx$Delay$_{allDevices}$)$-$UniversalQueueSize$>=0$, and UniversalQueueSize$<=$SupportedSink$Q$Size$_{min}$.

In a third case, source device 40A establishes multiple unicast communication sessions with multiple sinks devices 1, 2, ... , n, for example each of sink devices 42. Upon receiving the SupportedSinkQSize from each of sink devices 42 interested in setting up a communication session, source device 40A sorts the transmission schedule such that the one of sink devices 42 with the largest SupportedSinkQSize will be the first recipient of the media stream, and the one of sink devices 42 with the second largest SupportedSinkQSize will be the second recipient of the media stream, and so on. After determining the transmission schedule, source device 40A computes the TriggerDelay$_i$ for each of sink devices i=1, 2, ... n. The computation of the trigger delays for each of sink devices 42 is described in more detail below.

Source device 40A then determines the minimum supported queue size at sink devices 42 as follows:

SupportedSink$Q$Size$_{min}$=min((SupportedSink$Q$Size$-$(PktRate$*$TriggerDelay$_1$)),(SupportedSink$Q$Size$_2$$-$(PktRate$*$TriggerDelay$_2$)), ... (SupportedSink$Q$Size$_n$$-$(PktRate$*$TriggerDelay$_n$))).

In this case, the SupportedSinkQSize$_{min}$ is computed based only on the sink devices i with (SupportedSinkQSize$_i$$-$(PktRate$*$TriggerDelay$_i$))>0. Any sink device i with (SupportedSinkQSize$_i$$-$(PktRate$*$TriggerDelay$_i$))<0 could not be part of the same communication session as any sink device x with (SupportedSinkQSize$_x$$-$(PktRate$*$TriggerDelay$_x$))>0. Source device 40A then selects the universal queue size to be used by source device 40A and sink devices 42 for the unicast communication sessions such that:

MaxSync$Q$Size$-$(PktRate$*$TriggerDelay$_{source}$)$-$UniversalQueueSize$>=0$ where TriggerDelay$_{source}$ is equal to the TxDelay for the sink device that is the last recipient of the media stream, and UniversalQueueSize$<=$SupportedSink$Q$Size$_{min}$.

Accordingly, it may be possible to notify each of the sink devices of their respective trigger delay interval.

As illustrated in FIG. 3, based on the universal queue size selected by session manager 41, the media processing pipeline of source device 40A generates a source queue 44 having the universal queue size between parser 18 and decoder 20. Similarly, the media processing pipelines of sink devices 42 also generate sink queues 46 having the universal queue size between receivers 30 and decoders 32. In some examples, an additional queue may be generated between decoder 20 and rendered 22 in source device 40A and between decoders 32 and renderers 34 in sink devices 42. In this case, as part of queue size selection processes described above, session manager 41 of source device 40A may also select as universal queue size for the additional queue between the decoder and renderer.

Once source queue 44 having the universal queue size is generated, parser 18 processes stored content 16 and extracts out the different media streams, i.e., audio and/or video streams. The universal queue size can generally be based on a number of frames or an amount of time for video to be displayed. For example, in some devices 500 to 2500 milliseconds of video might be stored. Many different universal queue sizes to store this video are possible, for example, from 0.01 Mb to 10,000 Mb, 0.1 Mb to 1,000 Mb, or 1 Mb to 100 Mb. Additionally, queue size for a particular system may vary based on the characteristics of the video used by that system.

Queue monitor 43 of source device 40A coordinates with parser 18 to send the media packets to source queue 44. Source queue 44 then holds the media packets output from parser 18 prior to further processing by the media processing pipeline of source device 40A. The data packets, such as media packets are also sent to each of sink devices 42 as part of the communication session. At sink devices 42, queue monitors 47 coordinate with receivers 30 to send the media packets to sink queues 46 having the universal queue size. Sink queues 46 hold the media packets received from source device 40A prior to any further processing by the media processing pipeline of sink devices 42.

Source device 40A and sink devices 42 may achieve synchronized packet processing by applying different methods depending on the type of communication session established.

In a first case, a communication session is established between source device 40A and only one sink device, for example sink device 42A. When queue monitor 47A of sink device 42A detects that sink queue 46A is completely filled, queue monitor 47A triggers decoder 32A to start processing the media packets in sink queue 46A after a TriggerDelay interval for sink device 42A. In general, the TriggerDelay interval represents the wait time between detecting that sink queue 46A is full but before beginning processing of the media packets. In the first case where the communication session is established with only sink device 42A, the TriggerDelay interval value is equal to 0 because decoder 32A can begin processing the media packets as soon as sink queue 46A is filled.

Source device 40A, on the other hand, waits until sink queue 46A of sink device 42A is filled with the media packets to begin processing the media packets. When queue monitor 43 of source device 40A detects that source queue 44 is completely filled, queue monitor 43 triggers decoder 20 to begin processing the media packets in source queue 44 after TxDelay, i.e., the transmission time from source device 40A to sink device 42A. In this way, queue monitor 43 ensures that source device 40A and sink device 42A begin processing the media packets at the same time.

In a second case, a multicast communication session is established between source device 40A and multiple sink devices 1, 2, ... n, for example both of sink devices 42. The same method of achieving synchronized packet processing as described above for the first case may be used for the second case. During the multicast communication session, all of sink devices 42 will receive the media packets from source device 40A at the same time such that the TriggerDelay interval value for each of sink devices 42 is equal to 0. In addition, the TxDelay interval values for sink devices 42 are all the same. In this case, sink queues 46 will be filled with the media packets at the same time and each of decoders 32 can begin synchronized processing of the media packets as soon as the respective sink queues 46 are filled. Source device 40A waits the TxDelay time before beginning synchronized processing with sink devices 42. One of several factors in the value of TxDelay is the one way delay or the roundtrip delay divided by two.

The one way delay or roundtrip delay divided by two is dependent on distance and processing delay introduced by hardware and software layers. Accordingly, TxDelay, is largely influenced by the processing delay introduced by hardware and software layers. Different devices have different capabilities. It will be understood that many different delays are possible.

Additionally, the TxDelay values at source device 40B may be dependent on processing capabilities of the sink device. Accordingly, processing speed is a factor in calculating TxDelay. Depending on the processing capability of the sink device processing time may impact TxDelay values by, for example, anywhere from 1 millisecond to 20 milliseconds, and perhaps longer for some sink devices depending on processing power. Other systems may have decoding delays of 1 millisecond to 100 milliseconds. In some systems, typical TxDelay, might vary from 300 microseconds to 1500 microseconds.

In a third case, multiple unicast communication sessions are established between source device 40A and multiple sink devices 1, 2, . . . n, for example both of sink devices 42. One-way transmission delay from source device 40A to each of sink devices 1, 2, . . . n is $TxDelay_1$, $TxDelay_2$, . . . $TxDelay_n$, respectively. Similarly, the receive delay at each of the sink devices is $RxDelay_1$, $RxDelay_2$, . . . $RxDelay_n$. Session manager 41 of source device 40A computes the TriggerDelay for each of sink devices 42 that participate in the communication sessions. The TriggerDelay for each of sink devices 42 is calculated such that the respective one of sink devices 42 waits until sink queues 46 of the remaining sink devices 42 are filled with the media packets to begin processing the media packets.

Source device 40A may send a payload of media packets to sink devices in the following order: sink device n, sink device n−1, . . . sink device 2, and sink device 1. Session manger 41 of source device 40A then calculates the TriggerDelay value of sink device x as $TriggerDelay_x = RxDelay_1 + RxDelay_2 + \ldots + RxDelay_{x-1}$. For example, source device 40A may send the media packets to sink device 42A first with a receive delay of 0, and then send the media packets to sink device 42B second with a receive delay of approximately 5 milliseconds (ms). Session manager 41 may then calculate a TriggerDelay value for sink device 42A as equal to the RxDelay of sink device 42B, i.e., 5 ms, and calculate a TriggerDelay value for sink device 42B as equal to zero. Session manager 41 of source device 40A notifies each of sink devices 42 of the associated TriggerDelay either before or during the communication session setup.

Session manager 41 of source device 40A also calculates the local source TriggerDelay value. The TriggerDelay value of source device 20A is set equal to the TxDelay for the sink device that is the last recipient of the media stream. In this example, the last recipient of the media packets is sink device 1, such that $TriggerDelay_{source} = TxDelay_1$. In this way, source device 40A waits until all of sink queues 46 of sink devices 42 are filled with the media packets to begin processing the media packets. According to these techniques, the TriggerDelay values are tailored and skewed at each of sink devices 42 and source device 40A. In this way, source device 40A and all of sink device 42 will begin processing the media packets at the same time to provide synchronized playback of the media data. All the participating devices will, therefore, display the same video frame at any given time instance.

In the third case described above, during the universal queue size determination, session manager 41 calculates the minimum supported queue size across all sink devices 42, $SupportedSinkQSize_{min}$, based on more than just the supported queue sizes at each of the sink devices. The minimum supported queue size also takes into account the TriggerDelay interval for each of the sink devices. This additional parameter ensures that none of the sink devices will miss the next incoming media packet while waiting for the TriggerDelay interval.

For example, source device 40A sends the media packets to sink device 42 according to a set packet rate. A wide variety of packet rates might be used, from 15 packets per second (or even less) to 1,000 packets per second or more. The packet rate may generally be dependent on packet size and the data rate. Typical packet rates for some systems may be 15-60 packets per second. Once the sink queues are filled, however, sink devices 42 are unable to receive any additional media packets until packet processing begins to make space in the sink queues for the additional media packets. In some cases, the sink devices at or near the top of the transmission schedule may have to wait for long TriggerDelay intervals between detecting that the sink queue is full and beginning packet processing. These sink devices may be in danger of missing incoming packets during the long delay if there is no space in the sink queues to hold the incoming packets. The packet rate may be based on the bit rate for the communication session. An example bit rates for some devices may be, but are not limited to an absolute minimum bit rate of 400 Kbps, a starting bit rate of 4 Mbps and an absolute max bit Rate of 10 Mbps. Bit rates may impact the video format that might be used, for example, see Table 1.

TABLE 1

| Video Format | Min Bit Rate | Nominal Bit Rate | Max Bit Rate |
|---|---|---|---|
| WVGA @ 30 fps | 400 kbps | 1 Mbps | 4 Mbps |
| 720p @ 30 fps | 2 Mbps | 6 Mbps | 10 Mbps |
| 1080p @ 30 fps | 4 Mbps | 10 Mbps | 20 Mbps |

In order to avoid packet losses, session manager 41 calculates the minimum supported queue size taking the TriggerDelay intervals into account, as set forth above. This minimum supported queue size ensures that session manager 41 selects the universal queue size to be smaller than the smallest queue size supported across all sink devices 42. As an example, by selecting the universal queue size to be equal to 4 when all of the sink devices support a queue size of at least 5, all of the sink devices will have space in their queues to hold any incoming media packets during the TriggerDelay interval.

In one example, one or more of sink device 42 may leave or drop out during the communication session. Source device 40A will stop transmitting the media packets to the departed one of sink devices 42. To ensure that the packet processing at source device 40A and the remaining sink devices 42 continues to be synchronized and to avoid packet losses, source device 40A pauses for TxTime, i.e., the transmit time at source device 40A, instead of transmitting the media packet to the departed sink device. After the pause, source device 40A resumes transmitting the media packets to the sink devices scheduled to receive the packets after the departed sink device. In this way, the synchronized playback of the media data may continue after a sink device leaves the communication session without having to reconfigure the transmission schedule or recalculate the TriggerDelay values for each of sink devices 42.

In another example, one or more of sink devices 42 may join during the communication session. When a sink device n+1, e.g., joins the communication session, session manager 41 of source device 40A adds sink device n+1 to the top of the recipient list. Source device 40A then sends the media packet to the new sink device n+1 before sending the packets to any of the other sink devices 42. In addition, session manager 41 calculates the TriggerDelay value for the new sink device n+1 to ensure synchronized playback of the media data at all devices, including the new sink device n+1:

$$TriggerDelay_{n+1} = RxDelay_1 + RxDelay_2 + \ldots RxDelay_n.$$

Accordingly, the trigger delay is dependent on how many Sink devices present in the system and the order they are scheduled. Typical values might range from 0 millisecond if only one sink device present to <=2.4 to 12 milliseconds if there are 8 sink devices going to participate in the session, for example).

By adding the new sink device n+1 to the top of the recipient list, the new sink device will have the longest TriggerDelay interval because it needs to wait until the sink queues 46 of all the other sink devices 42 are full. The TriggerDelay intervals remains the same for the subsequent sink devices 42 because the transmission scheduling order after the new sink device n+1 remains the same. In this way, the synchronized playback of the media data may continue after a new sink device joins the communication session without having to recalculate the TriggerDelay values for the existing sink devices 42. Once the new sink device n+1 is added into the communication session, the new sink device begins receiving the media packets from source device 40A. Once the sink queue of the new sink device is full, the new sink device begins processing the media packets after the TriggerDelay interval in synch with all the other devices in the WD system.

In some cases, based on latency needs of the WD system or the media content type of the communication session, session manager 41 of source device 40A may set the TriggerDelay values and/or the universal queue size to zero or a very small number. In other cases, when source device 40A is not in an active communication session with one or more of sink devices 42, source device 40A may shrink and/or bypass source queue 44 to improve the local response time at source device 40A. In this case, the media packet at source device 40A may move directly from parser 18 to decoder 20, and the media packets received at sink devices 42 may move directly from receivers 30 to decoders 32.

In another example a unicast communication session may be established between source device 40A and each of sink devices 42. In this case, session manager 41 of source device 40A computes the TriggerDelay for each of sink devices 42 that participate in the communication session. For example, session manger 41 of source device 40A calculates the TriggerDelay value of sink device x as $$TriggerDelay_x = RxDelay_1 + RxDelay_2 + \ldots + RxDelay_{x-1},$$

where RXDelayx is the receive delay at sink device x. The TriggerDelay for each of sink devices 42 is calculated such that each of sink devices waits until the sink queues of all the sink devices are filled with the data packets to begin processing the data packets. Session manager 41 of source device 40A notifies each of sink devices 42 of the associated TriggerDelay either before or during the communication session setup.

Session manager 41 of source device 40A also calculates a local source TriggerDelay value. The TriggerDelay value of source device 20A is set equal to the transmission delay for the sink device that is the last recipient of the media stream. In this way, source device 40A waits until all of sink queues 46 of sink devices 42 are filled with the data packets to begin processing the data packets. According to these techniques, the TriggerDelay values are tailored and skewed at each of sink devices 42 and source device 40A. In this way, source device 40A and all of sink devices 42 will begin processing the media packets at the same time to provide synchronized playback of the media data.

When queue monitor 47A of sink device 42A detects that sink queue 46A is completely filled, queue monitor 47A triggers decoder 32A to start processing the media packets in sink queue 46A after the calculated TriggerDelay interval for sink device 42A. In general, the TriggerDelay interval represents the wait time between detecting that sink queue 46A is full but before beginning processing of the media packets. Sink device 42B operates similarly based on the calculated TriggerDelay interval for sink device 42B. Source device 40A waits until both sink queue 46A of sink device 42A and sink queue 46B of sink device 42B are filled with the data packets to begin processing the data packets. When queue monitor 43 of source device 40A detects that source queue 44 is completely filled, queue monitor 43 triggers decoder 20 to begin processing the data packets in source queue 44 after the local source TxDelay. In this way, queue monitor 43 ensures that source device 40A and sink devices 42 begin processing the media packets at the same time.

In other examples, the techniques of this disclosure may be applied to different types of communication sessions, such as multicast communication sessions or unicast communication sessions with only one sink device. For these cases, the techniques may operate substantially similar as described above, but with modified delay interval calculations. For example, in the multicast case all the sink devices will receive the data packets from the source device at the same time, so no trigger delay is calculated for the different sink devices. Similarly, in the single unicast case there is only one sink device to receive the data packets from the source device so no trigger delay is calculated for the single sink device.

The techniques may also take the time offset between source device 40A and each of sink devices 42 in account to achieve synchronized playback at all the devices. For example, session manager 41 of source device 40A may use the Real-time Transport Control Protocol (RTCP) to measure the time offset as well as the transmission delay between source device 40A and each of sink devices 42. Based on the RTCP feedback received from each of sink device 42, source device 40A adjusts the presentation time stamp (PTS) for local rendering at source device 40A. Each of sink devices 42 may also receive RTCP feedback from the other sink devices 42 to adjust the PTS for local rendering at the respective sink device.

Communication sessions may include communication over one or more communication channels. These communication channels may be relatively short-range communication channel, and may implement a physical channel structure similar to Wi-Fi, Bluetooth, or the like, such as implementing defined 2.4, GHz, 3.6 GHz, 5 GHz, 60 GHz or Ultrawideband (UWB) frequency band structures. However, the communication channel is not necessarily limited in this respect, and may comprise any wireless or wired communication medium, such as a radio frequency (RF) spectrum or one or more physical transmission lines, or any combination of wireless and wired media. In other examples, the communication channel may even form part of a packet-based network, such as a wired or wireless local area network, a wide-area network, or a global network such as the Internet. Additionally, the communication channel may be used by source device 40A and sink device 42 to create a peer-to-peer link.

WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 40A and sink device 42 may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

FIG. 4 is a block diagram illustrating a WD system including a source device 40B and sink devices 42 capable of participating in a synchronized communication session in frame buffer mode according to the techniques of this disclosure. Source device 40B operates substantially similar to source device 40A from FIG. 3 with respect to selecting the universal queue size for use at source device 40B and sink devices 42 and calculating the trigger delay values of each of sink devices 42 to provide synchronized playback of the media packet at the individual devices. Source device 40B illustrates an alternative media processing pipeline than the one illustrated in source device 40A of FIG. 3. In the frame buffer mode illustrated in FIG. 4, source device 40B captures, encodes, and transmits the media frames to source device 40B. At this stage of the media processing pipeline, source device 40A does not need to decode the media content.

In the illustrated example of FIG. 4, similar to source device 40A, source device 40B includes session manager 41, queue monitor 43, source queue 44 having the universal queue size, stored content 16, local display 24, and transmitter (TX) 26. Source device 40B further includes display processor 52, frame buffer 54, display driver host 58, display driver client 60, video processor 62, screen capture module 63, encoder 64, and transport module 66. Display processor 52 represents a display processor that produces output in raw-pixel format (e.g., RGB, YUV, YCbCr). The raw-pixel data is first held in frame buffer 54. Display driver host 58, e.g. a Mobile Display Digital Interface (MDDI) host driver, represents the driver that pushes media content from frame buffer 54 to display driver client 60. Display driver client 60 controls the rendering of the media content at local display 24.

Session manger 41 of source device 40B may establish synchronized communication sessions with sink devices 42 in the frame buffer mode according to the techniques described in this disclosure. In frame buffer mode, source device 40B uses a similar approach as described above with respect to source device 40A from FIG. 3. For example, session manger 41 selects the universal queue size based on the supported queue sizes of sink devices 42. Once the universal queue size is selected and the participating devices are notified, source device 40B generates source queue 44 having the universal queue size and sink devices 42 generate sink queues 46 having the universal queue size. Session manager 41 of source device 40B also calculates the TxDelay, RxDelay, and TriggerDelay for each of participating sink devices 42, and then notifies the respective sink devices 42 of the delay interval values. In the frame buffer mode, queue monitor 43 coordinates processing of the media content output from display processor 52, display driver host, 58, and transport module 66.

As stated above, source device 40B illustrates an alternative media processing pipeline in which source device 40B already uses decoded media content to render it on local display 24. Sink device 42, however, still need to decode the received media frames. When calculating the TxDelay values, source device 40B may take the decoding time at each of sink devices 42 into account.

After source queue 44 having the universal queue size is generated at source device 40B, display processor 52 creates media frames from stored content 16 into frame buffer 54 in order to display the media frames on local display 24. Each media frame is also captured by screen capture module 63, encoded by encoder 64, and transmitted to each of participating sink devices 42 by transmitter (TX) 26. Queue monitor 43 keeps track of each media frame in the media processing pipeline of source device 30B, including encoding and transmission. Once a given media frame has been transmitted to sink devices 42, queue monitor 43 moves the corresponding media frame from frame buffer 54 to source queue 44. When queue monitor 43 detects that source queue 44 is filled, queue monitor 43 triggers the display driver host 58 to wait TxDelay and then begin rendering the media frame. In this way, source device 40A will wait to begin processing the media frame for display on local display 24 until all sink devices 42 have had enough time to receive and start processing the same frame.

As described above with respect to FIG. 3, when queue monitor 47A at sink device 42A, for example, detects that sink queue 46A is filled, queue monitor 47A triggers decoder 32A to begin processing the media frame after a TriggerDelay interval for sink device 42A. When the communication session is established with only sink device 42A or when the communication session is a multicast session with multiple sink devices, the TriggerDelay interval value is equal to 0 because decoder 32A can begin processing the media frame as soon as sink queue 46A is filled. When multiple communication sessions are established with multiple sink devices, session manager 41 of source device 40B calculates the TriggerDelay interval for each of the sink devices. In this way, each of sink devices 42 will wait to begin processing the received media frame until all sink devices 42 have had enough time to receive and start processing the same frame.

Figure 5:
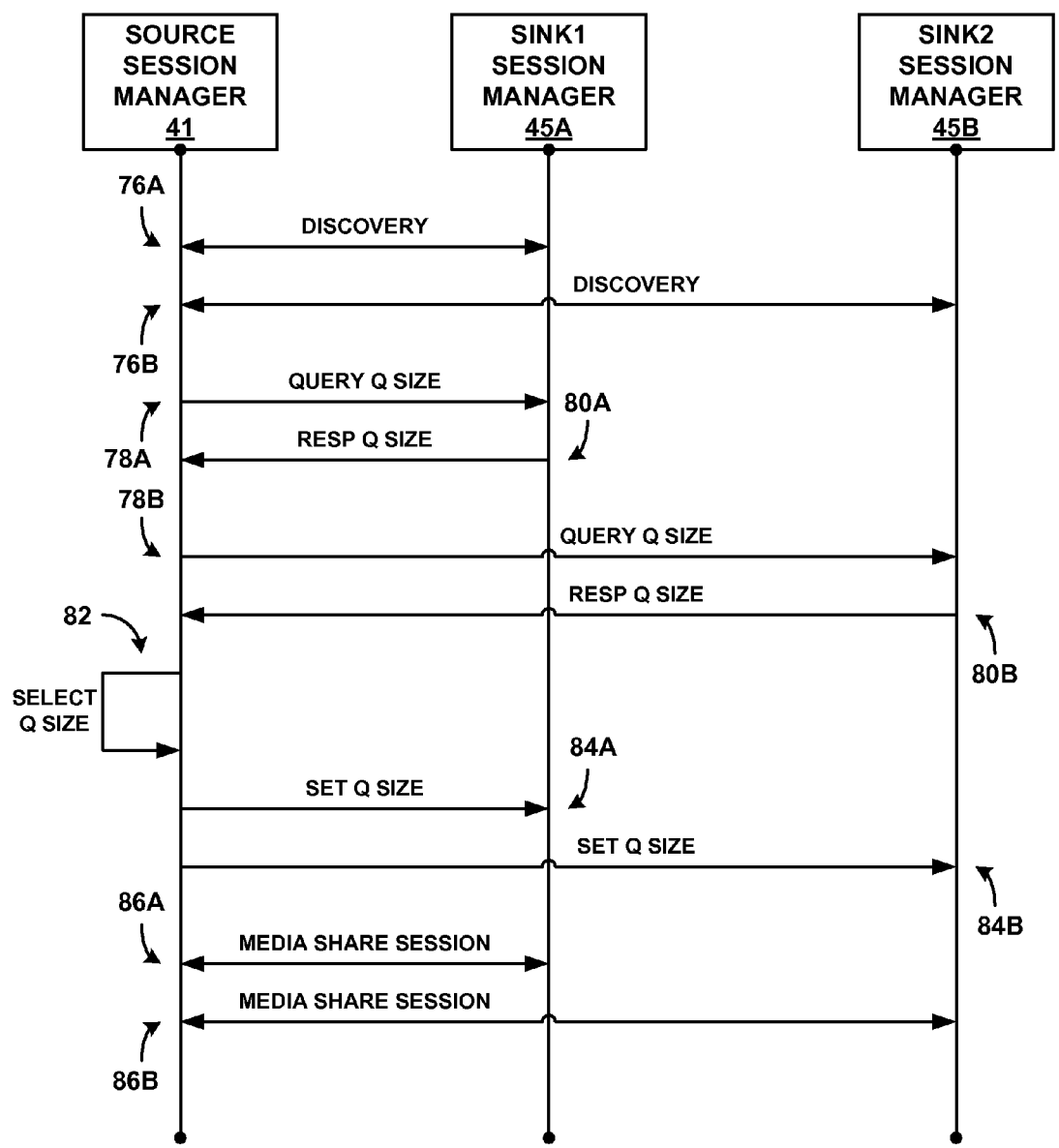
FIG. 5 is a logical diagram illustrating an exemplary information exchange used to select a universal queue size for a communication session between a source device and participating sink devices.

FIG. 5 is a logical diagram illustrating an exemplary information exchange used to select a universal queue size for a communication session between source device 40A and participating sink devices 42. For purposes of explanation, it may be assumed that the communication session is setup by source device 40A using solutions for a WD system. For example, source device 40A and sink devices 42A-42B perform device discovery to identify the devices participating in the communication session. Session manager 41 of source device 40A may initiate a discovery communication 76A with session manager 45A of sink device 42A to advertise that it has content to share and determine whether sink device 42A is interested in receiving the content. Session manager 41 of source device 40A may also initiate a discovery communication 76B with session manager 45B of sink device 42B to advertise that it has content to share and determine whether sink device 42B is interested in receiving the content.

When session manager 41 of source device 40A receives a request to establish a communication session for the advertised content with sink device 42A, session manager 41 sends a query 78A ("query Q size") to session manager 45A of sink device 42A for a supported queue size for the type of media data. Session manger 45A then sends a response 80A ("resp Q size") to session manager 41 that includes the supported queue size for sink device 42A. Similarly, when session manager 41 of source device 40A receives a request to establish a communication session for the advertised content with sink device 42B, session manager 41 sends a query 78B ("query Q size") to session manager 45B of sink device 42B for a supported queue size for the type of media data. Session manger 45B then sends a response 80B ("resp Q size") to session manager 41 that includes the supported queue size for sink device 42B.

Upon receiving responses from sink devices 42 that have been queried, session manager 41 at source device 40A then selects the universal queue size for use at all the participating devices during the communication session. Session manager 41 of source device 40A then sends a notification 82 ("select Q size") of the universal queue size to its own media processing pipeline, sends a notification 84A ("set Q size") of the universal queue size to session manager 45A of sink device 42A, and sends a notification 84B ("set Q size") of the universal queue size to session manager 45B of sink device 42B. The universal queue size value may be presented in a pre-determined fashion, e.g., time duration, number of frames, or the like. In other words, the universal queue size may be based on the ability to store a certain duration of video, for example, or a certain number of video frames. Accordingly, the universal queue size may be based on storing 1 second, 10 seconds, 20 seconds of video or more. Some devices may store longer durations of video while others may store shorter durations. Additionally, it will be understood that the time duration stored for a given universal queue size may vary based on the number of bits per second used for the video. Examples for different video formats and bit rates are provided in Table 1. Thus, assuming 1080p at 30 fps and a nominal bit rate of 10 Mbps the universal queue size to store 10 seconds of video would be 100 Mb. The universal queue size may alternatively be based on storing a certain number of video frames. Accordingly, assuming a frame for a particular video format requires 33,333.3 bits; if a device is designed to store 30 frames then the universal queue might store 1 Mb.

In some examples queue size might be defined based on the content of the video. For example, high motion video requires more data and accordingly, a larger queue size might be selected. The queue size may be based on the content or bit rate associated with the particular sequence such that different video would define different queue sizes to ensure that there isn't excessive latency or delay unless it is needed.

In some examples, session manger 41 may also notify each of session managers 45 of a trigger delay or other delay interval values calculated for each of sink devices 42. This delay interval might be used to delay processing of the media packets.

Session manager 41 of source device 40A may then initiate communication session 86A with sink device 42A and communication session 86B with sink device 42B. During the communication session, source device 40A and sink devices 42 will use queues having the universal queue size and associated delay intervals to ensure synchronized processing of the media packets. In this way, the techniques of this disclosure provide synchronized display of the media data at each of source device 40A and sink devices 42.

Figure 6:
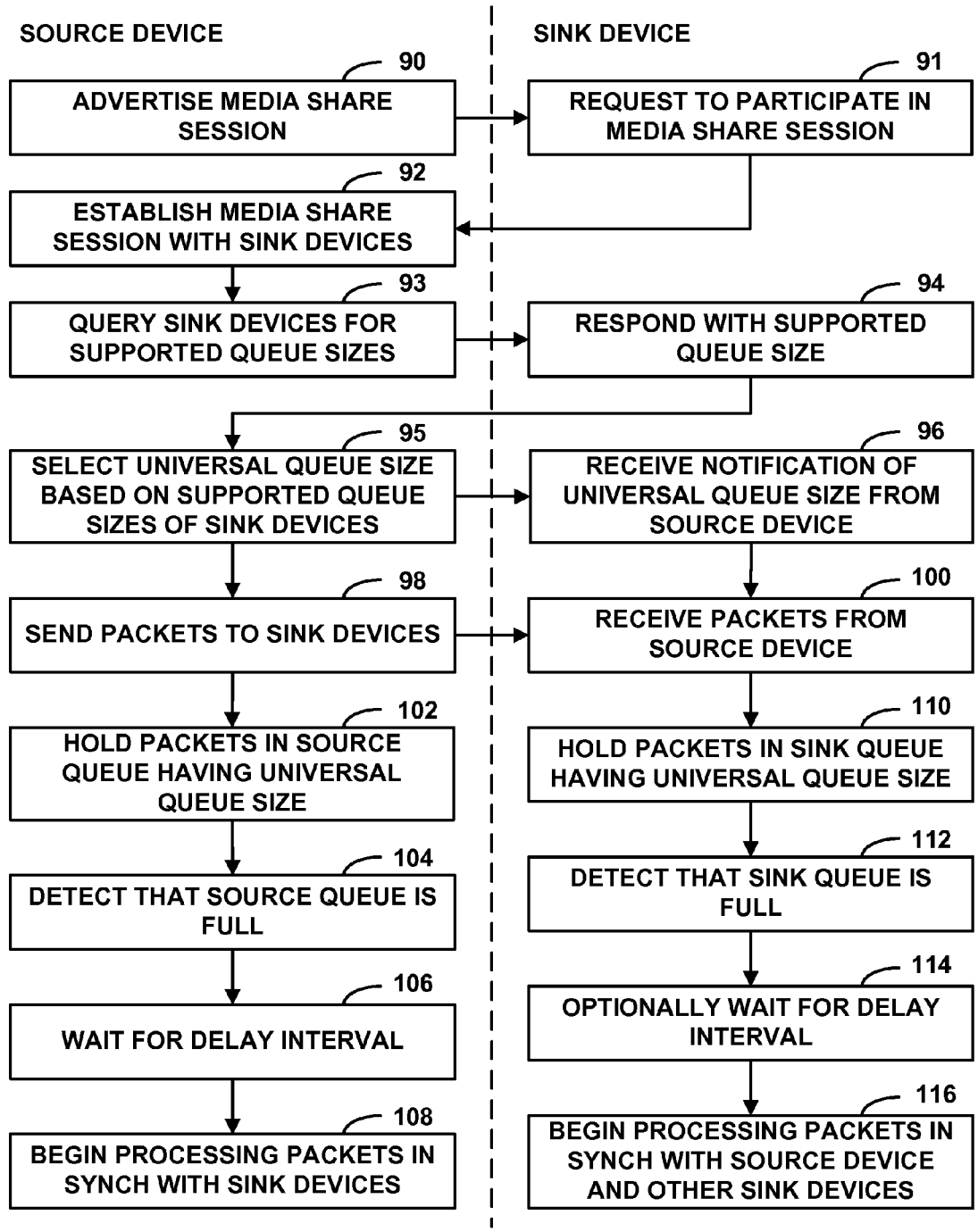
FIG. 6 is a flow chart illustrating an example operation of synchronizing a communication session between a source device and sink devices according to the techniques of this disclosure.

FIG. 6 is a flow chart illustrating an example operation of synchronizing a communication session between a source device and sink devices according to the techniques of this disclosure. The illustrated operation will be described with respect to source device 40A and sink devices 42 from FIG. 3. The illustrated operation may also be used with source device 40B from FIG. 4.

Session manager 41 of source device 40A advertises that it has content, e.g., audio and/or video content, to share with one or more sink devices 42 via a communication session (90). Session managers 45 of one or more of sink devices 42 respond to this advertisement by requesting to participate in the communication session (91). Upon receiving the requests, session manager 41 of source device 40A establishes the communication session with the requesting sink devices 42 (92). Session manager 41 then queries sink devices 42 to learn the supported queue size for the communication session at each of sink devices 42 (93). Each of session managers 45 of sink devices 42 responds with its supported queue size for the communication session (94).

Upon receiving the supported queue sizes for sink devices 42, session manager 41 of source device 40A selects a universal queue size for the communication session based on the supported queue sizes of the sink devices (95). Session manager 41 may select the universal queue size as described above with respect to FIG. 3. Each of sink device 42 then receives a notification from source device 40A of the universal queue size to be used for the communication session (96). Source device 40A and each of sink devices 42 generate queues having the universal queue size.

Source device 40A then sends packets to sink devices 42 as part of the communication session (98). At source device 40A, queue monitor 43 holds the packets in source queue 44 having the universal queue size (102). Queue monitor 43 monitors source queue 44. Once queue monitor 43 detects that source queue 44 is full (104), source device 40A waits for a delay interval (106) before it begins processing the packets in synch with sink devices 42 (108). The delay interval between when queue monitor 43 detects that source queue 44 is full (104) and source device 40A begins processing the packets in synch with sink devices 42 (108), may be calculated as described above with respect to FIG. 3. For example, the delay interval may be a transmission delay interval between source device 40A and sink devices 42 when the communication session is a unicast session with one source device or a multicast session. As another example, the delay interval may be a trigger delay interval until all sink devices 42 receive the packets when the communication session is multiple unicast sessions.

After source device 40A sends packets (98), each of sink devices 42 receives the packets from source device 40A (100). Upon receipt of the packets at sink device 42A, for example, queue monitor 47A holds the packets in sink queue 46A having the universal queue size (110). Queue monitor 47A monitors sink queue 46A. Once queue monitor 47A detects that sink queue 46A is full (112), sink device 42 may optionally wait for a delay interval (114) before it begins processing the packets in synch with source device 40A and other participating sink devices 42 (116). A similar process is conducted at each of sink devices 42 participating in the communication session. The optional delay interval between when queue monitor 47A detects that sink queue 46A is full (112) and sink device 42A begins processing the packets in synch with source device 40A and other sink devices 42 (116), may be calculated as described above with respect to FIG. 3. For example, the delay interval may be equal to 0 when the communication session is a unicast session with one source device or a multicast session. In this case, sink device 42A may begin processing the packets as soon as sink queue 46A is full. As another example, the delay interval may be a trigger delay interval until all other participating sink devices 42 receive the packets when the communication session is multiple unicast sessions.

Figure 7:
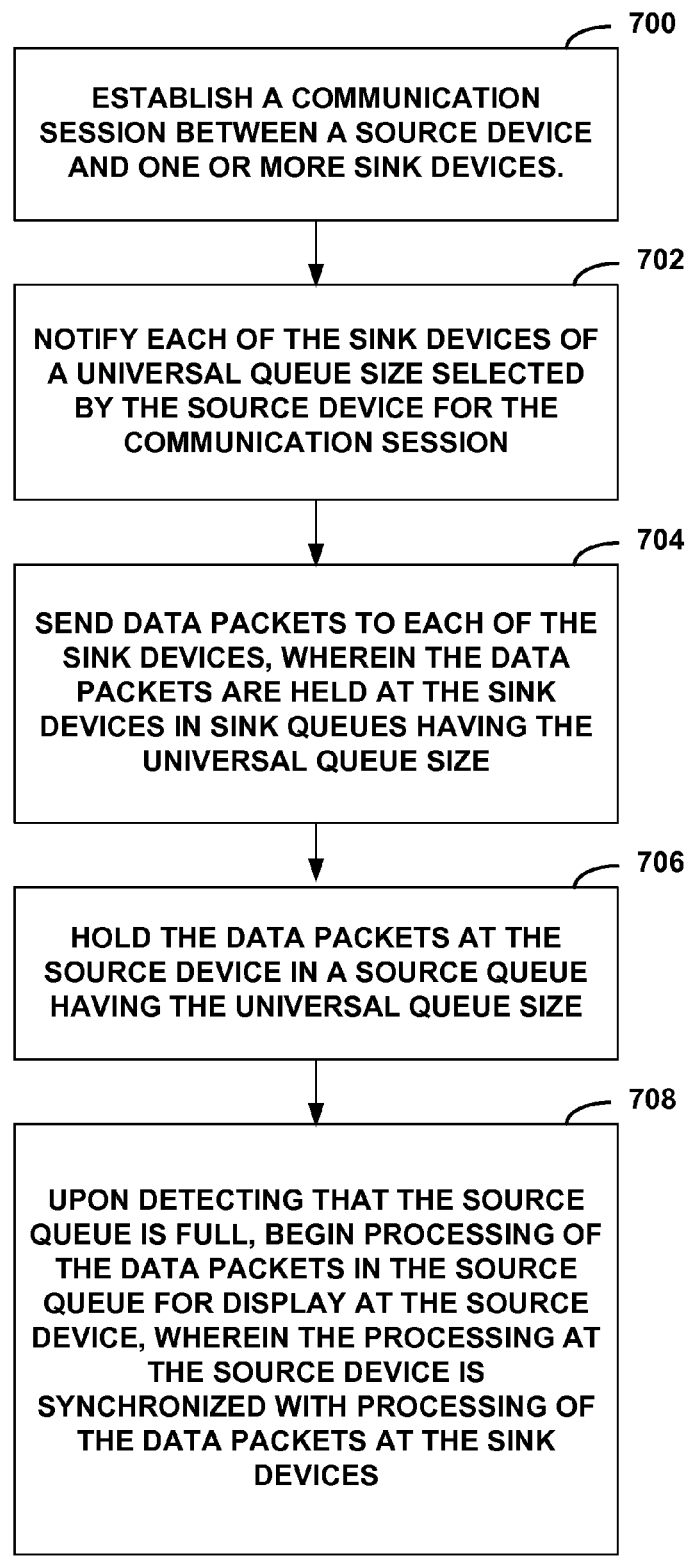
FIG. 7 is a flow chart illustrating an example method of synchronizing a communication session between a source device and sink devices in accordance with one or more examples described in this disclosure.

FIG. 7 is a flow chart illustrating an example method of synchronizing a communication session between a source device and sink devices in accordance with one or more examples described in this disclosure. The example method of FIG. 7 is from the perspective of the source device. Establishing the communication session may include establishing one of (1) a unicast communication session between the source device and one sink device, (2) a multicast communication session between the source device and multiple sink devices, and (3) multiple unicast communication sessions between the source device and multiple sink devices.

In the example method of FIG. 7 the source device 40A may establish a communication session with one or more sink devices 42 (700). The communication session may be, for example, a media share session between a source device 10, 40A and one or more sink devices 42B. In one example, establishing a communication session such as a media share session between a source device 40A and one or more sink devices 42 may include, for example, sending data packets to each of the sink devices 42 as part of the communication session.

The source device 40A notifies each of the sink devices 42 of a universal queue size that may be selected by for the communication session (702). The source device 40A selects the universal queue size based on the supported queue sizes of the source device 40A and the sink devices 42. The selection may also be based on a packet rate at the source device 40A, one or more of a transmission delay interval, a receive delay interval, or a trigger delay interval at each of the sink devices. A wide variety of packet rates might be selected from 15 packets per second (or even less) to 200 packets per second or more.

In an example method may calculate or measure a trigger delay interval for each of the sink devices that represents a wait time for the particular sink device between detecting that the sink queue is full and beginning processing of the data packets in the sink queue. Each of the sink devices may be notified of their respective trigger delay interval.

Unit 26 of source device 40A sends data packets to each of the sink devices 42A, 42B.). For example source device 40A may send data packets to sink devices 42 as part of the communication session (98). In another example, the sink devices 42 holds the data packets at in sink queues 46 having the universal queue size (704). In another example, queue monitor 43 of the source device 40A may hold the data packets in a source queue 44 having the universal queue size (706).

Upon detecting that the source queue 44 is full the source device 40A may begin processing of the data packets in the source queue for display at the source device (708). For example, queue monitor 43 of source device 40A may monitor source queue 44. Once queue monitor 43 detects that source queue 44 is full, source device 40A waits for a delay interval before it begins processing the packets in synch with sink devices 42. Additionally, the processing at the source device may be synchronized with processing of the data packets at the sink devices.

In some examples, the source device 40A may further query each of the sink devices 42 for supported queue sizes. Accordingly, the source device 40A may select the universal queue size with the sink devices 42. The universal queue size may be based on supported queue sizes of the source device 40A and the sink devices 42. The source device 40A may further measure a trigger delay interval for the source device 40A. The trigger delay interval may represent a time interval for a last sink device 42 to receive the data packets. Additionally, upon detecting that the source queue 44 is full, the source device 40A may wait for the trigger delay interval before beginning processing of the data packets in the source queue.

Figure 8:
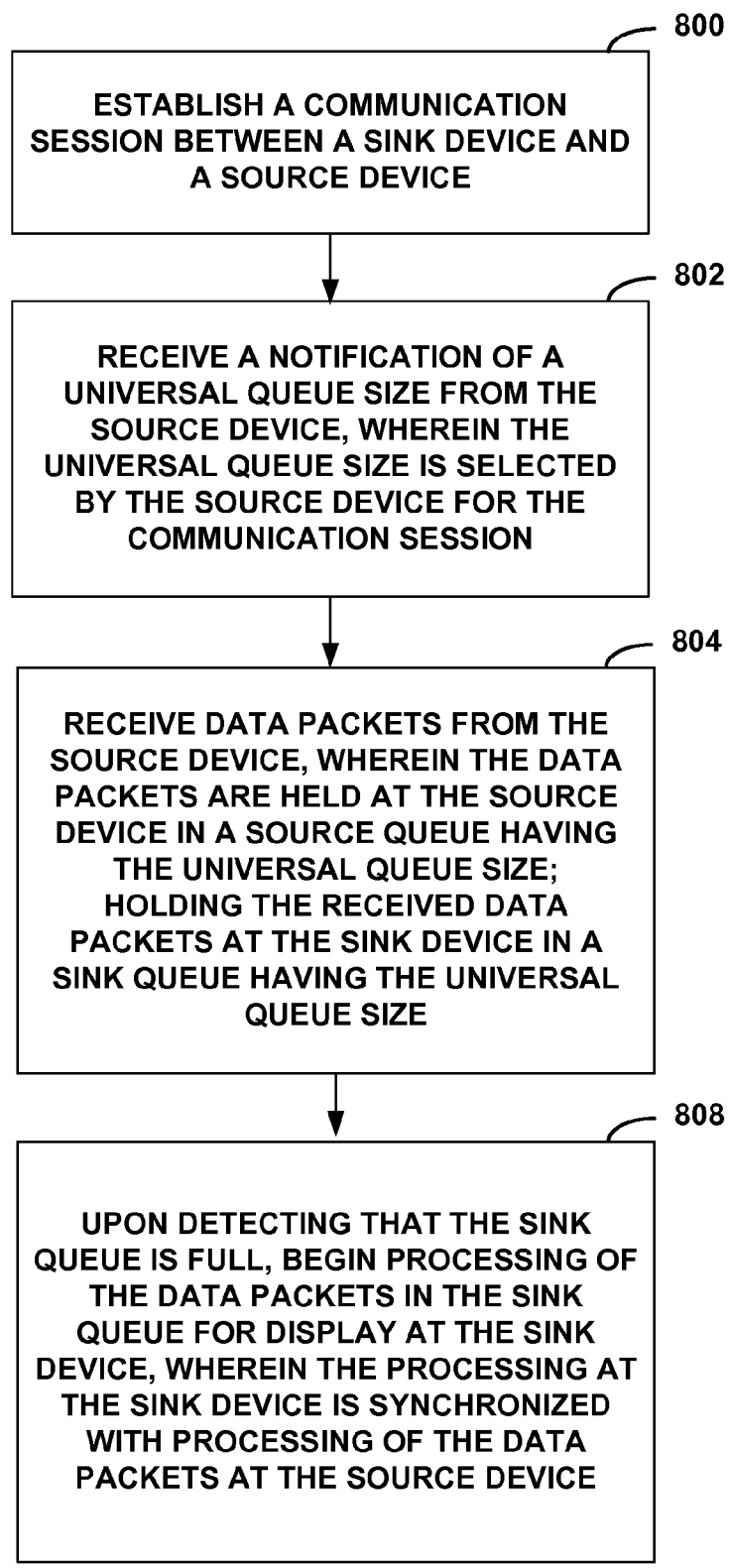
FIG. 8 is a flow chart illustrating an example method of synchronizing a communication session between a source device and sink devices in accordance with one or more examples described in this disclosure.

FIG. 8 is a flow chart illustrating an example method of synchronizing a communication session between a source device and sink devices in accordance with one or more examples described in this disclosure. The example method of FIG. 8 is from the perspective of a sink device.

In the example method of FIG. 8, the source device 40A may establish a communication session between the sink device 42 and a source device 40A (800). For example, source device 40A may send media data, such as audio and/or video (AV) data, to one or more of the sink devices 42 participating in a particular communication session. As discussed above, the media data may be played back at both a local display of the source device and at each of the displays of the sink devices. More specifically, each of the participating sink devices 42 may render the received media data on its screen and audio equipment. In some cases, a user of a sink device 42 may apply user inputs to the sink device 42, such as touch inputs and remote control inputs. In the WD system, the user inputs are sent from the sink device 42 to the source device 40A. The source device 40A processes the received user inputs from the sink device 42 and applies the effect of the user inputs on subsequent media data sent to the sink device.

The sink devices 42 may receive a notification of a universal queue size from the source device 40A. The source device 40A may select the universal queue size for the communication session (802). For example, each of sink devices 42 receives a notification from source device 40A of the universal queue size to be used for the communication session (96). Source device 40A and each of sink devices 42 may generate queues having the universal queue size.

The sink devices 42 may receive data packets from the source device 40A. The data packets may be held at the source device in a source queue having the universal queue size. Additionally, the received data packets may be held at the sink device in a sink queue having the universal queue size (804).

Upon detecting that the sink queue 46 is full, the sink devices 42 may begin processing of the data packets in the sink queue 46 for display at the sink device 42. The processing at the sink device 42 may be synchronized with processing of the data packets at the source device 40A (808). For example, once queue monitor 47A detects that sink queue 46A is full (112), sink device 42 may optionally wait for a delay interval (114) before it begins processing the packets in synch with source device 40A and other participating sink devices 42 (116). A similar process may be conducted at each of sink devices 42 participating in the communication session. The optional delay interval between when queue monitor 47A detects that sink queue 46A is full (112) and sink device 42A begins processing the packets in synch with source device 40A and other sink devices 42 (116), may be calculated as described above with respect to FIG. 3.

The example method may further respond to a query from the source device to report supported queue sizes of the sink device. Additionally, the universal queue size may be selected by the source device based on supported queue sizes of the source device and the sink device.

In an example, a notification of a trigger delay interval for the sink device may be received from the source device. The trigger delay interval may represent a time interval for a last of the other sink devices participating in the communication session to receive the media packets. In an example method, upon detecting that the sink queue is full, waiting for the trigger delay interval before beginning processing of the data packets in the sink queue.

Figure 9:
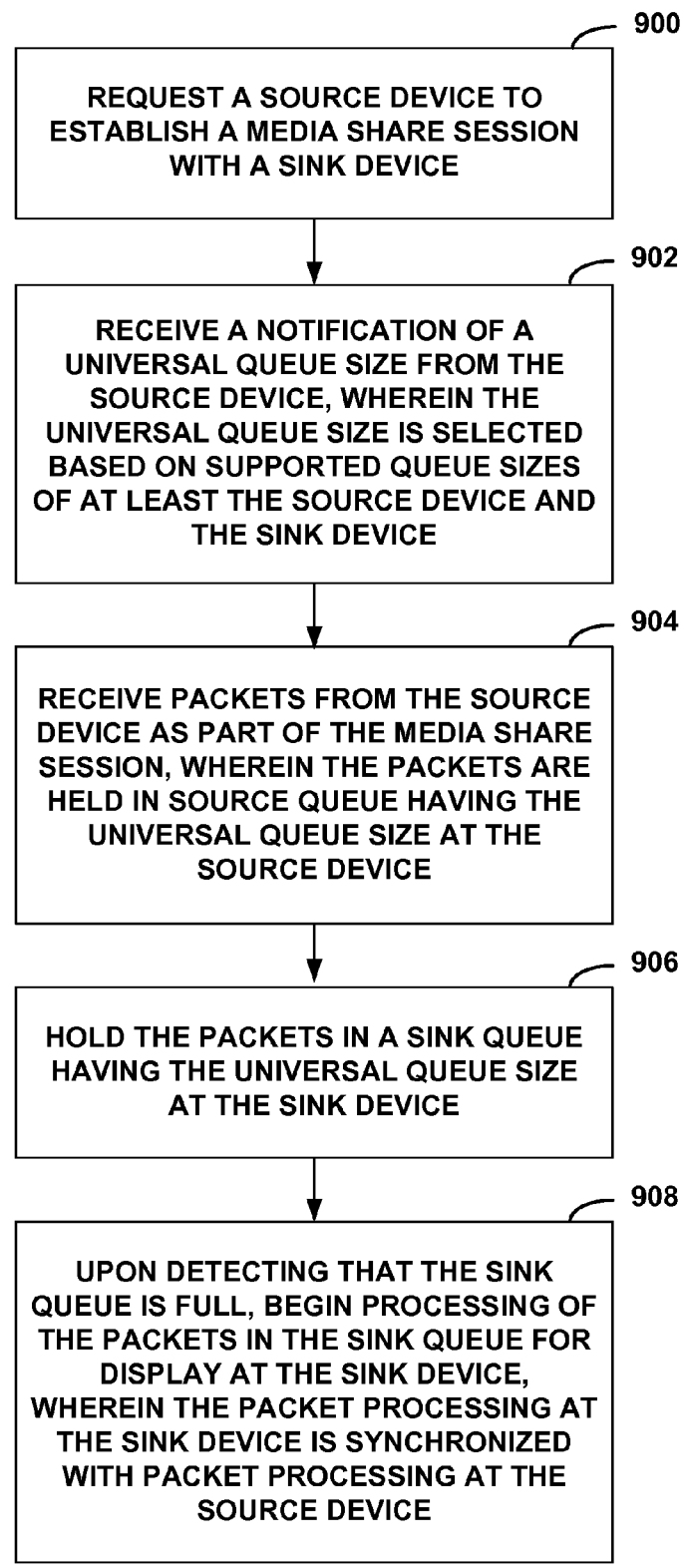
FIG. 9 is a flow chart illustrating an example method of synchronizing a communication session between a source device and sink devices in accordance with one or more examples described in this disclosure.

FIG. 9 is a flow chart illustrating an example method of synchronizing a communication session between a source device and sink devices in accordance with one or more examples described in this disclosure. The example method of FIG. 9 is from the perspective of a sink device.

In the example of FIG. 9 a sink device 42 may make a request a source device 40A to establish a communication session with (900). The communication session may include one of a (1) unicast communication session between the source device and only the sink device, (2) a multicast communication session between the source device and multiple sink devices, and (3) multiple unicast communication sessions between the source device and multiple sink devices. In one example, the trigger delay interval for the sink device 42 may be equal to zero.

In another example, the communication session may operate in one of a streaming mode and a frame buffer mode. For example, as discussed above, once established, the communication session may operate in a streaming mode in which the source device transmits stored encoded media streams, as illustrated in FIGS. 1 and 2, or in a frame buffer mode, in which the source device captures, encodes, and transmits display buffers, as illustrated in FIG. 4.

The sink device 42 may receive a notification of a universal queue size from the source device 40A (902). The source device 40A may select the universal queue size based on supported queue sizes of at least the source device 40A and the sink device(s) 42. Additionally, the universal queue size may be selected to be less than or equal to a minimum supported queue size across all sink devices 42 participating in the communication session. In an example, a sink device 42 may respond to a query from the source device 40A to report the supported queue size of the sink device 42.

The sink device(s) 42 may receive data packets from the source device 40A as part of the communication session (904). For example, after source device 40A sends packets, each of sink devices 42 receives the packets from source device 40A. Additionally, the data packets may be held in source queue having the universal queue size at the source device.

The sink device 42 may hold data packets in a sink queue having the universal queue size (906). For example, the sink device 42 may receive a notification of a trigger delay interval from the source device 40A. This trigger delay may be for the sink device 42. The trigger delay interval may represent a time interval for a last of the other sink devices participating in the communication session to receive the data packets, for example, media packets.

Upon detecting that the sink queue 46 is full, the sink device 42 may begin processing of the data packets in the sink queue 46 for display at the sink device 42. The packet processing at the sink device 42 may be synchronized with packet processing at the source device 40A (908). In an example, upon detecting that the sink queue 46 is full, the sink device 42 may wait for the trigger delay interval before beginning processing of the data packets in the sink queue 46.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    establishing a wireless communication session between a wireless source device and one or more wireless sink devices, wherein the wireless source device and one or more wireless sink devices comprise different devices;
    notifying the one or more wireless sink devices of a universal queue size selected by the wireless source device for the wireless communication session;
    sending media packets to each of the wireless sink devices, wherein the media packets are held at the one or more wireless sink devices in sink queues, each of the one or more wireless sink devices having a sink queue with a queue size equal to the universal queue size;
    calculating a trigger delay interval for each of the wireless sink devices that represents a wait time for a particular wireless sink device between detecting that the sink queue is full and beginning processing of the packets in the sink queue; and
    notifying each of the wireless sink devices of a respective trigger delay interval;
    holding the media packets at the wireless source device in a source queue having a queue size equal to the universal queue size; and
    in response to detecting that the source queue is full, after waiting for a wait time corresponding to a trigger delay interval for one of the one or more wireless sink devices, beginning processing of the media packets in the source queue for display at the wireless source device, wherein the processing at the wireless source device is synchronized with processing of the media packets at the wireless sink devices; and
    displaying the processed media packets at the wireless source device.

2. The method of claim 1, wherein the wireless communication session comprises a media share session between the wireless source device and the one or more wireless sink devices.

3. The method of claim 1, further comprising: querying each of the wireless sink devices for supported queue sizes; and selecting, with the wireless source device, the universal queue size based on supported queue sizes of the wireless source device and the wireless sink devices.

4. The method of claim 1, further comprising: measuring a transmission delay interval for the wireless source device, wherein the transmission delay interval represents a time interval for a last wireless sink device to receive the media packets; and in response to detecting that the source queue is full, waiting for the transmission delay interval before beginning processing of the media packets in the source queue.

5. The method of claim 1, wherein establishing the wireless communication session comprises establishing one of a unicast communication session between the wireless source device and one wireless sink device, a multicast communication session between the wireless source device and multiple wireless sink devices, and multiple unicast communication sessions between the wireless source device and multiple wireless sink devices.

6. The method of claim 1, further comprising querying each of the wireless sink devices for a supported queue size.

7. The method of claim 1, further comprising notifying each of the wireless sink devices of the universal queue size selected.

8. The method of claim 1, wherein selecting the universal queue size comprises selecting the universal queue size to be less than or equal to a minimum supported queue size across all the wireless sink devices.

9. The method of claim 8, further comprising calculating the minimum supported queue size across all the wireless sink devices based on the supported queue sizes and trigger delay intervals of the wireless sink devices.

10. The method of claim 1, wherein selecting the universal queue size comprises selecting the universal queue size based on supported queue sizes of the wireless source device and the wireless sink devices, a packet rate at the wireless source device, and one or more of a transmission delay interval, a receive delay interval, and a trigger delay interval at each of the wireless sink devices.

11. The method of claim 1, wherein the wireless communication session comprises one of a unicast communication session between the wireless source device and one wireless sink device, and a multicast communication session between the wireless source device and multiple wireless sink devices, the method further comprising: measuring a transmission delay interval between the wireless source device and one of the wireless sink devices; and in response to detecting that the source queue is full, waiting for the transmission delay interval before beginning processing of the packets in the source queue.

12. The method of claim 1, wherein the wireless communication session comprises multiple unicast communication sessions between the wireless source device and multiple wireless sink devices, the method further comprising: measuring a transmission delay interval for the wireless source device, wherein the transmission delay interval represents a time interval for a last wireless sink device to receive the media packets; and in response to detecting that the source queue is full, waiting for the transmission delay interval before beginning processing of the packets in the source queue.

13. The method of claim 1, further comprising: excluding from the communication session a wireless sink device that cannot support the selected universal queue size supported by another wireless sink device.

14. The method of claim 13, wherein, when the wireless communication session comprises one of a unicast communication session between the wireless source device and one wireless sink device, and a multicast communication session between the wireless source device and multiple wireless sink devices, the trigger delay interval for each of the wireless sink devices is equal to zero.

15. The method of claim 1, wherein the wireless communication session operates in one of a streaming mode and a frame buffer mode.

16. The method of claim 1, further comprising: enforcing the universal queue size at all devices that will participate in the wireless communication session by notifying all the devices that will participate in the communication of the universal queue size selected by the wireless source device for the wireless communication session such that the sink queues on all devices that will participate in the wireless communication session have the universal queue size.

17. A wireless source device comprising: one or more processors configured to:
 establish a wireless communication session between the wireless source device and one or more wireless sink devices, wherein the wireless source device and one or more wireless sink devices comprise different devices,
 select a universal queue size based on supported queue sizes of the wireless source device and the one or more wireless sink devices, and
 calculate a trigger delay interval for each of the wireless sink devices that represents a wait time for a particular wireless sink device between detecting that the sink queue is full and beginning processing of the packets in the sink queue;
 cause a transmitter to transmit a notification to the one or more wireless sink devices of the universal queue size selected for the wireless communication session, wherein the transmitter sends media packets to each of the one or more wireless sink devices to be held in sink queues as part of the wireless communication session, each of the one or more wireless sink devices having a sink queue with a queue size equal to the universal queue size and transmit a notification to each of the wireless sink devices of a respective trigger delay interval; and
 a memory storing a source queue having a queue size equal to the universal queue size that holds the packets, wherein, in response to detecting that the source queue is full and after waiting for a wait time corresponding to the trigger delay, the one or more processors begin processing the media packets in the source queue for display at the wireless source device, wherein the data packet processing at the wireless source device is synchronized with packet processing at the wireless sink devices; and
 a display for displaying the processed media packets.

18. The wireless source device of claim 17, wherein the wireless communication session comprises a media share session between the wireless source device and one or more wireless sink devices.

19. The wireless source device of claim 17, wherein the one or more processors are further configured to: query each of the wireless sink devices for supported queue sizes; and select, with the wireless source device, the universal queue size based on supported queue sizes of the wireless source device and the wireless sink devices.

20. The wireless source device of claim 17, wherein the one or more processors are further configured to: measure a transmission delay interval for the wireless source device, wherein the transmission delay interval represents a time interval for a last wireless sink device to receive the media packets; and in response to detecting that the source queue is full, waiting for the transmission delay interval before beginning processing of the media packets in the source queue.

21. The wireless source device of claim 17, wherein to establish the wireless communication session the one or more processors are further configured to establish one of a unicast communication session between the wireless source device and one wireless sink device, a multicast communication session between the wireless source device and multiple wireless sink devices, and multiple unicast communication sessions between the wireless source device and multiple wireless sink devices.

22. The wireless source device of claim 17, wherein the one or more processors are further configured to query each of the wireless sink devices for a supported queue size.

23. The wireless source device of claim 17, wherein the one or more processors are further configured to notify each of the wireless sink devices of the universal queue size selected.

24. The wireless source device of claim 17, wherein the one or more processors are further configured to select the universal queue size comprises selecting the universal queue size to be less than or equal to a minimum supported queue size across all the wireless sink devices.

25. The wireless source device of claim 24, wherein the one or more processors are further configured to calculate the minimum supported queue size across all the wireless sink devices based on the supported queue sizes and trigger delay intervals of the wireless sink devices.

26. The wireless source device of claim 17, wherein the one or more processors are further configured to select the universal queue size comprises selecting the universal queue size based on supported queue sizes of the wireless source device and the sink wireless devices, a packet rate at the wireless source device, and one or more of a transmission delay interval, a receive delay interval, and a trigger delay interval at each of the wireless sink devices.

27. The wireless source device of claim 17, wherein, when the wireless communication session comprises one of a unicast communication session between the wireless source device and one wireless sink device, and a multicast communication session between the wireless source device and multiple wireless sink devices, the trigger delay interval for each of the wireless sink devices is equal to zero.

28. The wireless source device of claim 17, wherein the wireless communication session operates in one of a streaming mode and a frame buffer mode.

29. The wireless source device of claim 17, wherein the one or more processors are further configured to exclude from the wireless communication session a wireless sink device that cannot support the selected universal queue size.

30. A wireless source device comprising:
 means for establishing a wireless communication session between the wireless source device and one or more wireless sink devices, wherein the wireless source device and one or more wireless sink devices comprise different devices;
 means for notifying each of the wireless sink devices of a universal queue size selected by the wireless source device for the wireless communication session;
 means for sending media packets to each of the wireless sink devices, wherein the media packets are held at the one or more wireless sink devices in sink queues, each of the one or more wireless sink devices having a sink queue with a queue size equal to the universal queue size;
 means for calculating a trigger delay interval for each of the wireless sink devices that represents a wait time for a particular wireless sink device between detecting that the sink queue is full and beginning processing of the packets in the sink queue;

means for notifying each of the wireless sink devices of their respective trigger delay interval;

means for holding the media packets at the wireless source device in a source queue having a queue size equal to the universal queue size; and in response to detecting that the source queue is full, after waiting for a wait time corresponding to a trigger delay interval for one of the one or more wireless sink devices, means for beginning processing of the media packets in the source queue for display at the wireless source device, wherein the processing at the wireless source device is synchronized with processing of the media packets at the wireless sink devices; and means for displaying the processed media packets at the wireless source device.

31. The wireless source device of claim 30, further comprising means to: query each of the wireless sink devices for supported queue sizes; and select, with the wireless source device, the universal queue size based on supported queue sizes of the wireless source device and the wireless sink devices.

32. The wireless source device of claim 30, further comprising means to: measure a transmission delay interval for the wireless source device, wherein the transmission delay interval represents a time interval for a last wireless sink device to receive the media packets; and in response to detecting that the source queue is full, waiting for the transmission delay interval before beginning processing of the media packets in the source queue.

33. A non-transitory computer-readable medium comprising instructions that when executed in a wireless source device cause a processor to:

establish a wireless communication session between the wireless source device and one or more wireless sink devices, wherein the wireless source device and one or more wireless sink devices comprise different devices;

notify each of the wireless sink devices of a universal queue size selected by the wireless source device for the wireless communication session;

send media packets to each of the wireless sink devices, wherein the media packets are held at the one or more wireless sink devices in sink queues, each of the one or more wireless sink devices having a sink queue having with a queue size equal to the universal queue size;

calculate a trigger delay interval for each of the wireless sink devices that represents a wait time for a particular wireless sink device between detecting that the sink queue is full and beginning processing of the packets in the sink queue;

notify each of the wireless sink devices of their respective trigger delay interval;

hold the media packets at the wireless source device in a source queue having a queue size equal to the universal queue size; and in response to detecting that the source queue is full, after waiting for a wait time corresponding to a trigger delay interval for one of the one or more wireless sink devices, begin processing of the media packets in the source queue for display at the wireless source device, wherein the processing at the wireless source device is synchronized with processing of the media packets at the wireless sink devices; and display the processed media packets at the wireless source device.

34. The computer-readable medium of claim 33, further comprising instructions that when executed in a wireless source device cause a processor to: query each of the wireless sink devices for supported queue sizes; and select, with the wireless source device, the universal queue size based on supported queue sizes of the wireless source device and the wireless sink devices.

35. The computer-readable medium of claim 33, further comprising instructions that when executed in a wireless source device cause a processor to: measure a transmission delay interval for the wireless source device, wherein the transmission delay interval represents a time interval for a last wireless sink device to receive the media packets; and in response to detecting that the source queue is full, waiting for the transmission delay interval before beginning processing of the media packets in the source queue.

36. The wireless source device of claim 17, wherein the processor is further configured to enforce the universal queue size at all devices that will participate in the wireless communication session by causing the transmitter to transmit the notification to all devices that will participate in the wireless communication session, the notification including the universal queue size selected for the wireless communication session, such that the sink queues on all devices that will participate in the wireless communication session has the universal queue size.

* * * * *